(12) United States Patent
Herwig et al.

(10) Patent No.: US 9,517,364 B2
(45) Date of Patent: Dec. 13, 2016

(54) SPREADER TIP FOR A RESCUE TOOL

(71) Applicant: Weber-Hydraulik GmbH, Losenstein (AT)

(72) Inventors: Peter Herwig, Floh-Seligenthal (DE); Johann Schmollngruber, Grossraming (AT); Kurt Strohmeier, Aschach an der Steyr (AT)

(73) Assignee: Weber-Hydraulik GmbH, Losenstein (AT)

( * ) Notice: Subject to any disclaimer, the term of this patent is extended or adjusted under 35 U.S.C. 154(b) by 0 days.

(21) Appl. No.: 14/903,680

(22) PCT Filed: Jul. 9, 2014

(86) PCT No.: PCT/AT2014/050155
§ 371 (c)(1),
(2) Date: Jan. 13, 2016

(87) PCT Pub. No.: WO2015/003198
PCT Pub. Date: Jan. 15, 2015

(65) Prior Publication Data
US 2016/0144205 A1    May 26, 2016

(30) Foreign Application Priority Data
Jul. 11, 2013    (AT) .................. GM50103/2013 U (51) Int. Cl.
| B23D 17/06 | (2006.01) |
| A62B 3/00 | (2006.01) |
| F16G 15/06 | (2006.01) |

(52) U.S. Cl.
CPC ............... *A62B 3/005* (2013.01); *F16G 15/06* (2013.01)

(58) Field of Classification Search
CPC .................. A62B 3/005; F16G 15/06
USPC ........................................ 72/392
See application file for complete search history.

(56) References Cited

U.S. PATENT DOCUMENTS

| 4,333,330 | A | * | 6/1982 | Porter | A62B 3/005 |
| | | | | | 72/392 |
| 4,842,249 | A | * | 6/1989 | Weigand | F16G 15/06 |
| | | | | | 254/93 R |
| 5,622,353 | A | * | 4/1997 | Painter | A62B 3/005 |
| | | | | | 254/93 R |
| 5,956,992 | A | * | 9/1999 | Patton | A62B 3/005 |
| | | | | | 72/392 |
| 6,308,355 | B1 | | 10/2001 | McMillan et al. | |

(Continued)

FOREIGN PATENT DOCUMENTS

| AT | 010 110 U1 | 9/2008 |
| DE | 198 12 454 C1 | 7/1999 |

(Continued)

OTHER PUBLICATIONS

International Search Report of PCT/AT2014/050155, mailed Nov. 27, 2014.

*Primary Examiner* — David B Jones
(74) *Attorney, Agent, or Firm* — Collard & Roe, P.C.

(57) ABSTRACT

The invention relates to a spreader tip (32) for replaceable attachment to two pincer-like co-operating spreader arms (4) of a rescue tool (1). Mounted on a working face (35) of the spreader tip (32) is at least one insert element (39) which protrudes from and has different material properties in comparison with the spreader tip (32).

15 Claims, 3 Drawing Sheets

(56) References Cited

U.S. PATENT DOCUMENTS

| | | | |
|---|---|---|---|
| 6,311,537 B1 * | 11/2001 | Vigil | A62B 3/005 254/133 R |
| 8,800,343 B2 * | 8/2014 | Wettlaufer | A62B 3/005 72/392 |
| 9,180,322 B2 | 11/2015 | Wettlaufer et al. | |
| 2010/0025647 A1 | 2/2010 | Strohmeier | |

FOREIGN PATENT DOCUMENTS

| | | |
|---|---|---|
| GB | 2 254 580 A | 10/1992 |
| WO | 2011/100655 A2 | 8/2011 |

* cited by examiner

Fig. 2

SPREADER TIP FOR A RESCUE TOOL

CROSS REFERENCE TO RELATED APPLICATIONS

This application is the National Stage of PCT/AT2014/050155 filed on Jul. 9, 2014, which claims priority under 35 U.S.C. §119 of Austrian Application No. GM 50103/2013 filed on Jul. 11, 2013, the disclosure of which is incorporated by reference. The international application under PCT article 21(2) was not published in English.

The invention relates to a spreader tip as well as a rescue tool equipped with this spreader tip.

AT 010 110 U1 owned by this same applicant discloses a rescue tool with pincer-like spreader arms which have surface regions on at least mutually facing inner faces of the spreader arms in which a wear resistance is greater than the wear resistance of adjacent parts. Furthermore, the surface of the spreader arms disposed in the region of surfaces which grip objects is provided with protruding shapes to provide a strong purchase to counteract slipping on objects. Interchangeable spreader tips are also provided on the ends of the spreader arms, which are made from a high-strength and wear-resistant, preferably heat-treated, material. The spreader tips are made from such a material because the spreader tips are also based on a design having a toothed or serrated surface imparting a strong purchase to prevent slipping when working with sheet metal. These protuberances on the surface of the spreader tip should not be susceptible to excessive wear caused by use and should also not become bent. The spreader tip should also have a sufficient bending strength to enable it to absorb the high forces which act on the spreader tip when working with the rescue tool without being broken. The spreader tips are attached to the spreader arm by means of a bolt and can therefore be easily detached and replaced by hand.

The disadvantage of the design described in AT 010 110 U1 is that when choosing a material for the spreader tip, not all the demands required of the spreader tip in terms of properties can be satisfied. This is because different material properties of a material mutually affect one another. For example, a material having a high bending strength and high ductility may have a high surface hardness and a good resistance to wear at the same time but only to a limited degree. However, given that a high bending strength is absolutely necessary to enable the forces acting on the spreader tip to be absorbed, wear resistance, especially of protruding parts such as serrations or toothing projections which are subjected to very high stress, can usually be achieved to only a limited degree.

Other tips for spreaders are known from DE 198 12 454 C1 and GB 2 254 580 A.

The underlying objective of this invention is to propose an improved spreader tip for replaceable attachment to spreader arms of a rescue tool, and the spreader tip should have a high bending strength to be capable of withstanding high forces during use of the rescue tool. Furthermore, the spreader tip should have a high surface hardness and wear resistance at points which, locally, are subjected to a high degree of stress to avoid the occurrence of excessive wear after repeated use of the rescue tool. In addition, when the spreader tip is used for salvage and rescue operations, it should exhibit a high resistance to slipping on objects. As a result of these features, the quality problems and risk of breakage of known designs should be eliminated or reduced.

These objectives are achieved by the features according to the invention, in particular by means of a spreader tip with insert elements mounted on a working face of the spreader tip.

The invention proposes a spreader tip for replaceable attachment to two pincer-like co-operating spreader arms of a rescue tool and, mounted on a working face of the spreader tip, is at least one insert element which protrudes from and has different material properties in comparison with the spreader tip. By using different materials for the spreader tip and insert element, material properties that are suited to different types of stress can be selected. The advantage of the design proposed by the invention is that because of the insert elements in the spreader tip, additional purchase is obtained which prevents slipping when working on an object. Accordingly, the insert element can be optimized so as to provide the material properties required as a priority, such as high wear resistance or high compression strength for example. At the same time, the spreader tip can be provided with the required material properties, such as high bending strength and high ductility. Due to an advantageous shape, the insert element is easily able to pierce the materials to be forced apart, deforming them as it does so, during use of the rescue tool. This affords a good purchase to counteract slipping on objects, for example metal panels of a vehicle. The use of a rescue tool with a spreader tip based on this design of is very much of advantage compared with a rescue tool having conventional spreader tips.

It is also of practical advantage if the insert elements have a wear resistance that is greater than the wear resistance of the spreader tip. This is of particular advantage because increased wear is to be expected due to penetration of the materials during the process of forcing materials apart. The type of wear to be expected in the case of this application is abrasive wear which occurs as a result of the relative movement between the insert element and the material to be forced apart. Wear is tested using the Taber Abraser in accordance with ISO 9352, ASTM D 1044 or DIN EN-Norm 438-2.6.

It is also of practical advantage if the insert elements have a higher compression strength and/or hardness than the comparative values of the spreader tip. The advantage of this is that for the insert element, due to higher compression strength of approximately 4000-5900 $N/mm^2$ and a high hardness of approximately Vickers hardness HV30: 1300-2400, a relatively brittle material can be used, which has a lower bending strength than the material of the spreader tip. As a result, it is advantageously possible to make use of the material properties that are needed locally on the spreader tip, thereby tailoring the spreader tip as a whole to a very efficient design.

Furthermore, the insert elements may be of a pin-shaped design with or without a land. The advantage of using pin-shaped insert elements is that bores can be provided in the spreader tip in which the insert elements are inserted. However, another option is to make the spreader tip by a casting process and instead of bores, which have to be made in the spreader tip subsequently, recesses are provided in which the insert elements are accommodated. Another advantage is that pin-shaped insert elements are easy and inexpensive to produce so that the complexity and cost of manufacturing a spreader tip with this type of insert elements can be relatively low. If the pin-shaped insert elements are additionally provided with a land, this will have the advantageous effect that the forces which occur during the spreading operation can be transmitted from the insert element across the end face of the land into the spreader tip.

It may also be of advantage if the insert elements are joined to the spreader tip by means of a firmly bonded connection, for example an adhesive join or a soldered connection. The major advantage of a firmly bonded connection resides in the fact that both the insert element and the spreader tip can be easily produced and require no specific surface geometry such as a fixing thread. Manufacturing tolerances are also moderate because any smaller gaps can be compensated by an adhesive.

Alternatively or in addition, the insert elements can be mounted in the spreader tip by means of a positive connection, for example toothing or engagement with a land provided on the insert element. The advantage of this is that securing the insert element by means of a positive connection means that it can be more easily removed from the spreader tip, for example so that a damaged or worn insert element can be easily replaced. The insert elements may have a land for example, in which a locking element secured to the spreader tip by means of a screwed connection engages. A connection of this type may be based on a design similar to that by which a tipped tool is fitted in a tool bit. Another option, if the insert element is a pin-shaped element with a land, is to screw it into the spreader tip using some type of clamping nut with an external thread. It would also be conceivable to provide the insert element with a thread so that it can be screwed directly into the spreader tip.

Based on another embodiment, the insert elements can be mounted in the spreader tip by means of a frictional connection, for example using a clamping bar. The advantage of this is that securing the insert element by means of a positive connection means that it can easily be removed, for example so that a damaged or worn insert element can be easily replaced. By contrast with a system of securing the insert element by means of a positive connection, no special design of the insert element is necessary to enable it to be accommodated in the spreader tip. This brings another advantage because the insert element can be designed as a standard product and no special fitting has to be made to enable insertion in a spreader tip.

Based on another option, the insert elements are preferably provided in the form of sintered parts, in particular made from carbide. The advantage of this is that carbide best satisfies requirements in terms of surface hardness and wear resistance. Such carbide parts can be mass produced and are optimal in terms of their material properties, as well as being inexpensive.

It is also of practical advantage if the insert elements are disposed in several rows at different distances from the wedge-shaped tip of the spreader tip. The advantage of this is that using several insert elements at different distances from the wedge-shaped tip of the spreader tip means that a large area of the spreader tip can be provided with insert elements of this type so that the advantageous properties of the insert element can be used on a large working area of the spreader tip and when working with different sizes of gaps in the objects to be forced apart.

It is also of practical advantage if, of several part-portions of the working face of identical size, the part-portion lying closest to the wedge-shaped tip of the spreader tip is provided with a lesser number of insert elements than one of the part-portions lying farther away. Due to a bore used to accommodate an insert element in the spreader tip, the spreader tip is made weaker, as a result of which the effective cross-section for absorbing a bending moment in the spreader tip is reduced. The forces that can be absorbed by the spreader tip are also reduced as a result. The advantage gained from the layout of insert elements in the spreader tip described above is that in the case of the wedge-shaped spreader tip in the region having a low cross-sectional height, only one bore is provided for accommodating an insert element. In a part-portion lying farther away from the wedge-shaped tip of the spreader tip which already has a bigger cross-sectional height, several bores for accommodating an insert element can be provided. This enables the bending strength of the spreader tip to be optimally distributed across its entire length.

Another option is for the insert elements to be pointed, tooth-shaped or jagged on the portion thereof lying outside the spreader tip. The advantage of such a design is that the pointed insert element more easily pierces the material to be deformed when the rescue tool is being used, thereby providing optimal assurance that it will be prevented from slipping on an object.

Based on another option, a recess may be provided on a working face for accommodating an insert element secured to a co-operating second spreader tip. This is of particular advantage if spreader tips disposed on two spreader arms are equipped with insert elements on their mutually facing inside faces. Due to the recesses, spreader tips based on this design can be moved so far towards one another that their mutually co-operating inside faces are able to make contact with one another. Accordingly, the portion of an insert element mounted in a spreader tip which protrudes out from the spreader tip can be accommodated in a sufficiently large recess of the oppositely lying second spreader tip. Due to these features, the insert elements are not in the way when the spreader arms are completely closed. The insert elements and the recesses for temporarily accommodating a portion of an insert element of an oppositely lying second spreader tip protruding out from the spreader tip may be provided on the spreader tip in different regions. For example, an insert element may be disposed on one half of the working face of the spreader tip at a certain distance from the wedge-shaped tip of the spreader tip. On the second half of the working face of the spreader tip, a recess may be provided at an identical distance from the wedge-shaped tip of the spreader tip for temporarily accommodating a portion protruding out from the spreader tip of an insert element of another spreader tip. As a result, when lying opposite one another, two spreader tips of an identical design can be moved towards one another so that a portion of an insert element protruding out from the spreader tip can be accommodated in a recess of the oppositely lying spreader tip. Based on another option, two spreader tips of different designs are used and in the case of one spreader tip, the insert elements are disposed at a certain distance from the wedge-shaped tip of the spreader tip and the other spreader tip is provided with the recesses for temporarily accommodating a portion of an insert element of the oppositely lying spreader tip protruding out from the spreader tip. The recess in this instance may be provided in the form of a blind bore and the depth of the recess may be dimensioned so that the recess is exactly deep enough to enable the portion of an insert element of an oppositely lying spreader that protrudes out from the tip spreader tip to be exactly accommodated. In other words, the recess is only slightly deeper than the height of the portion of an insert element that protrudes out from the spreader tip.

Furthermore, it may be of practical advantage to provide the recess in the form of an end-to-end bore. The particular advantage of this is that deposits of material which collect in the recess during use can be removed again via the rearward opening on the spreader tip. As a result, these accumulations of material which can lead to impaired function if they block the recess can be largely avoided. If, contrary to expectation, the accumulations of material are not pushed by an insert element of the oppositely lying spreader tip through the end-to-end bore to the rear opening, the recess can be freed of these material accumulations by means of a punch or drill.

Finally, based on another option, a bore in which an insert element is disposed connects with to an end-to-end bore. The advantage of this is that in the event that an insert element has to be replaced, it can be easily punched out of its housing by means of a punch from a working face lying on the opposite side of the spreader tip, thereby making it easier to replace insert elements. If using an insert element with a land, this end-to-end bore may have the same diameter as the diameter of the bore in which an insert element is accommodated. As a result, the forces exerted on the insert element are transmitted via the land into the spreader tip. If using an insert element without a land, the end-to-end bore may also be of a smaller diameter than the bore for accommodating an insert element so that the forces acting on the insert element can be transmitted to the spreader tip. A spreader tip may incorporate a combination of these different variants of end-to-end bores or a combination with bores for accommodating insert elements and regions which do not have a bore.

To provide a clearer understanding, the invention will be described in more detail with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
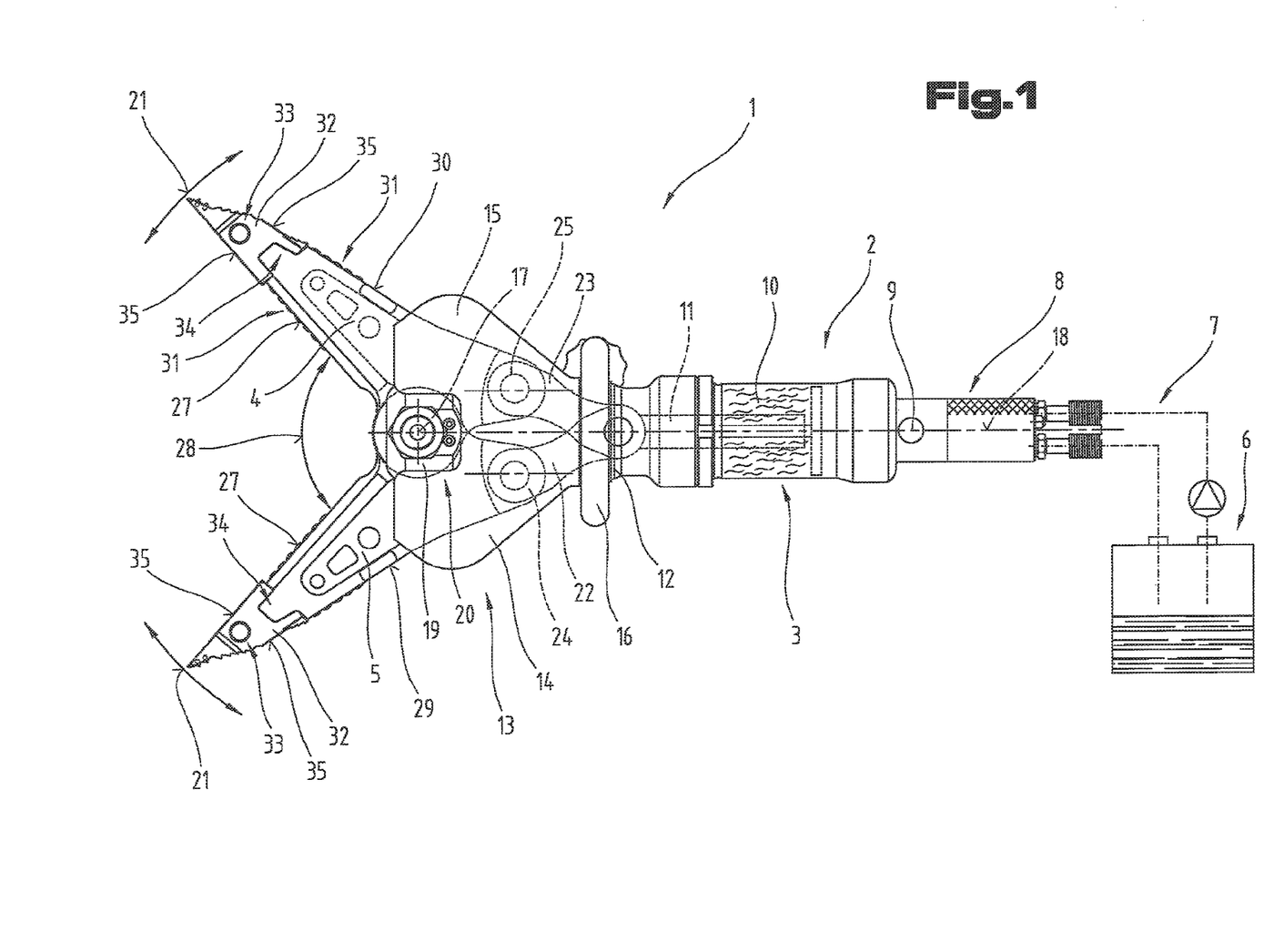
FIG. 1 a front view of a rescue tool with spreader arms and spreader tips.
Figure 2:
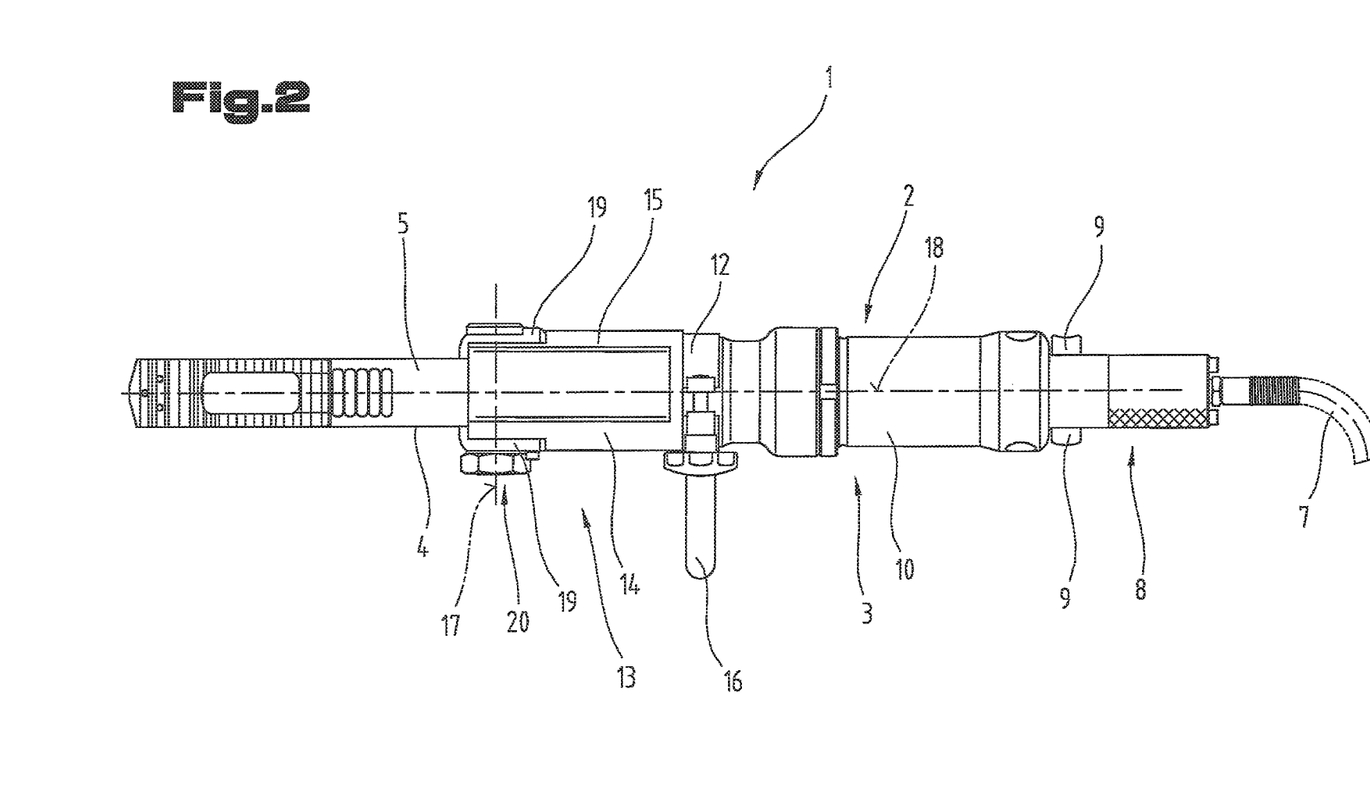
FIG. 2 a plan view of a rescue tool with spreader arms and spreader tips.

FIGS. 1 and 2 illustrate a rescue tool 1 with pincer-like displaceable spreader arms 4, 5 mounted so as to be displaceable by means of a linear drive device 2 on a cylindrical body 3.

In the embodiment illustrated as an example, the drive device 2 comprises a hydraulic unit 6 with intake and discharge lines 7 and a tubular handle 8 with control means 9 integrated in it, as well as a hydraulic cylinder 10 with an actuator means 11 displaceable in a linear direction.

Disposed on an end flange 12 of the hydraulic cylinder 10 through which the actuator means 11 extends is a bearing housing 13 substantially comprising two parallel bearing plates 14, 15 disposed at a distance apart from one another. The rescue tool 1 preferably also has a carrying handle 16.

Disposed on the bearing plates 14, 15 is a pivot bearing 19 of a pivot bearing arrangement 20 for the spreader arms 4, 5, extending perpendicular to a longitudinal mid-axis 18 of the cylindrical body 3 and constituting a pivot axis 17. In this pivot bearing arrangement 20, the spreader arms 4, 5 are mounted so as to be pivotable about the pivot axis 17—as indicated by double arrows 21.

A drive connection between the linearly displaceable actuator means 11 of the hydraulic cylinder 10 and the spreader arms 4, 5 is provided in the form of transmission levers 22, 23 connected in an articulating arrangement to the actuator means 11 and to one of the spreader arms 4, 5 in each case.

Due to the fact that pivot bearings 24, 25, in which the transmission levers 22, 23 are connected to the spreader arms 4, 5 in an articulating arrangement, are eccentrically disposed with respect to the longitudinal mid-axis 18, the linear displacement of the actuator means 11 causes a pivoting movement of the spreader arms 4, 5 when the actuator means 11 is displaced. When the actuator means 11 is extracted, the spreader arms 4, 5 are moved towards one another and when the actuator means 11 is retracted, the spreader arms 4, 5 are moved into an open position.

In terms of the lever geometry, a displacement path of the actuator means 11 is such that in an extracted end position of the actuator means 11, the inside faces 26, 27 extend in alignment with the longitudinal mid-axis 18. When the spreader arms 4, 5 are in the open position, the inside faces 26, 27 subtend an angle 28.

This design enables the rescue tool 1 to be used to exert a crushing force on an object, not illustrated, between the oppositely lying inside faces 26, 27 during a displacement of the spreader arms 4, 5 in the direction of the longitudinal mid-axis 18, as well as a spreading force by means of opposing outside faces 29, 30 of the spreader arms 4, 5 during a displacement of the spreader arms 4, 5 into an open position.

The rescue tool 1 is therefore suitable for rescue work, e.g. for rescuing persons from inside a vehicle that has been involved in an accident where, due to deformation of the vehicle body, openings have to be made accessible by force, e.g. by crushing operations on body parts or by forcing apart objects such as doors, roof openings, etc.

The spreader arms 4, 5 are manufactured as forged parts from blanks using a high-strength Al alloy on a forging press, resulting in a high end quality and requiring little in the way of finishing work. Due to the choice of material, a high mechanical strength for withstanding the strong forces that occur during use of the rescue tool 1 is obtained at the same time. In addition to a high deformation resistance, however, high wear resistance at the working surfaces of the spreader arms 4, 5 is also crucial to uninterrupted use over long periods of time. Another requirement is that the spreader arms 4, 5 should not be able to slip off parts of objects on which they are working.

To impart a high resistance to slipping on an object, rib-like protuberances 31 are provided on the inside faces 26, 27 and optionally also on the outside faces 29, 30. Due to a high surface hardness, these have a high resistance to wear.

Also disposed on the spreader arms 4, 5 are spreader tips 32 which are made from a different material from that of the spreader arms 4, 5. These spreader tips 32 are preferably made from high-strength and wear-resistant, preferably heat-treated, material. They are designed for different tasks and situations and manually removable bolts 33 are provided as fixing means to enable rapid replacement. To enable high forces to be transmitted, a positive connection is also provided between the end regions 34 of the spreader arms 4, 5 and the spreader tips 32. Bending forces in particular, which can be directed to the spreader tip 32 by the spreading operation, can be effectively absorbed by this positive connection between the spreader tip 32 and spreader arms 4, 5 and transmitted from the spreader tip 32 to the spreader arms 4, 5.

A toothed surface 36 is also provided on the inner and outer working faces 35 of the spreader tip 32, which reduces or prevents slipping of the rescue tool 1 during spreading operations or when crushing vehicle parts.

Figure 3:
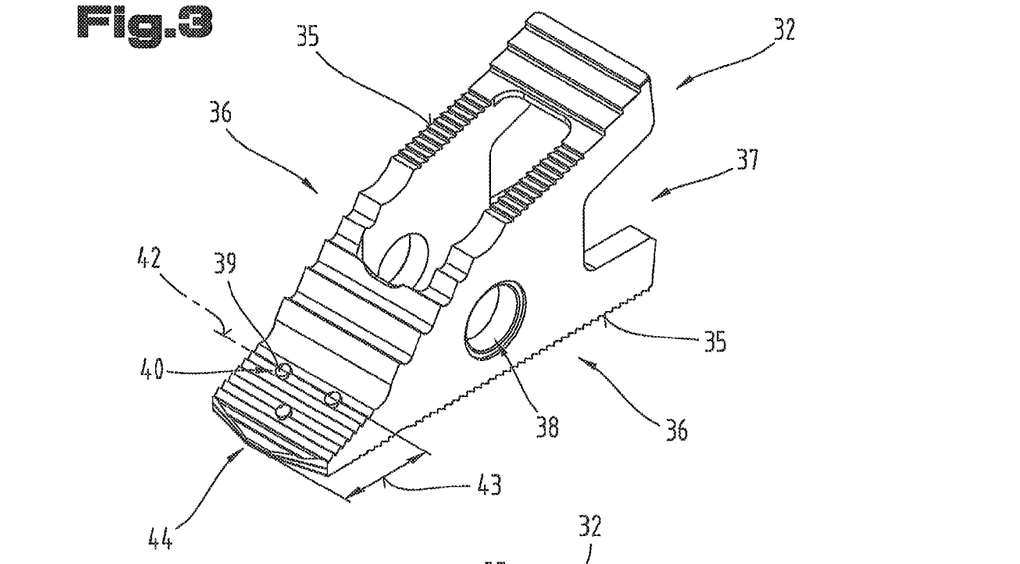
FIG. 3 a perspective view of a spreader tip.

FIG. 3 is a perspective view illustrating a spreader tip 32. Readily visible is a receiving orifice 37 in which the end region 34 of a spreader arm 4, 5 engages, thereby establishing the positive connection of the two parts. To provide a fixed connection, the bolt 33 is inserted in a bore 38 around which the receiving orifice 37 of the spreader tip 32 extends in the manner of a fork.

As clearly visible in this view, the toothed surface 36 of the working faces 35 is not of a uniform design across the entire working face 35 and instead, different tooth shapes and tooth sizes are provided with a view to obtaining optimum resistance to slipping on objects.

To further increase resistance to slipping on objects and thus optimize the functionality of the rescue tool 1, insert elements 39 are provided which are inserted in the spreader tip 32 at the working face 35 and protrude out from the working face 35. The insert elements 39 can be inserted in the spreader tip 32 in different ways using different fixing options. The major advantage of using insert elements 39 of the type described here is that if they are pointed in their portion 40 that protrudes out from the spreader tip 32, they are very effective as a means of preventing slipping on objects. The reason for this is that because the insert elements 39 are of a pointed design, they can pierce objects, for example metal panels of vehicles, thereby establishing a positive connection between the insert element 39 and a metal part.

To ensure that the insert elements 39 are able to pierce metal parts, it is necessary for the insert elements 39 to have a high hardness and compression strength. This will ensure that the insert elements 39 are not deformed when the rescue tool 1 is being used. High hardness will also reduce abrasive wear. This type of wear occurs due to friction when the insert element 39 pierces another material or slides along the surface of an object to be deformed. The relative movement can cause material to be lost from the insert element 39 in various ways, which manifests itself in the form of wear. An optimum material for an application based on a pin-shaped insert element 39 is carbide because it has very advantageous material properties for this particular application on the one hand and the manufacture of such carbide pins can be very easily automated.

In the embodiment illustrated in FIGS. 1-4, the insert elements 39 are glued in using a special adhesive, e.g. a two-component adhesive with a synthetic resin base. To this end, bores 41 must be provided in the spreader tip 32, which preferably form a tight clearance fit or a transition fit with the pin-shaped insert elements 39. This tight fit is important because the adhesive is subjected to relatively little stress under changing loads. The adhesive should also not be sensitive to temperature because in the case of a burning vehicle, for example, it may be necessary to work on very hot parts with the rescue tool 1. Furthermore, the adhesive must be capable of withstanding the effects of different chemical substances because when working on vehicles, various fluids which might damage an adhesion point can come into contact with a rescue tool.

The disposition of the insert elements 39 need not necessarily conform to a certain pattern. It has proved to be of advantage if the insert elements 39 are disposed in rows 42 and the individual insert elements 39 inserted in rows 42 are advantageously disposed at the same distance 43 from the wedge-shaped tip 44 of the spreader tip 32. However, it would also be conceivable for the distances 43 of the insert elements 39 from the wedge-shaped tip 44 of the spreader tip 32 to all be of different sizes so that the insert elements 39 are distributed on the working face 35 in an irregular pattern.

It is also of advantage if the insert elements 39 are disposed so that on part-portions 45 of the working face 35 that are of the same size, fewer insert elements 39 are disposed in a part-portion 45 that is closer to the wedge-shaped tip 44 of the spreader tip 32 than in a part-portion 45 that is farther away from the wedge-shaped tip 44 of the spreader tip 32. The advantage achieved as a result of this arrangement is that it does not have an excessively detrimental effect on the bending strength of the spreader tip 32. A positive effect on the bending strength of the spreader tip 32 is achieved by using fewer insert elements 39 in a front region of the spreader tip 32 so that it is not excessively weakened by the bores 41 needed to accommodate the insert elements 39. The wedge-shaped design of the spreader tip 32 whereby the spreader tip 32 has only a thin material cross-section on one side is intended to meet structural requirements because the rescue tool 1 must also be capable of penetrating very small gaps in order to open them up in the case of damaged vehicles.

Figure 4:
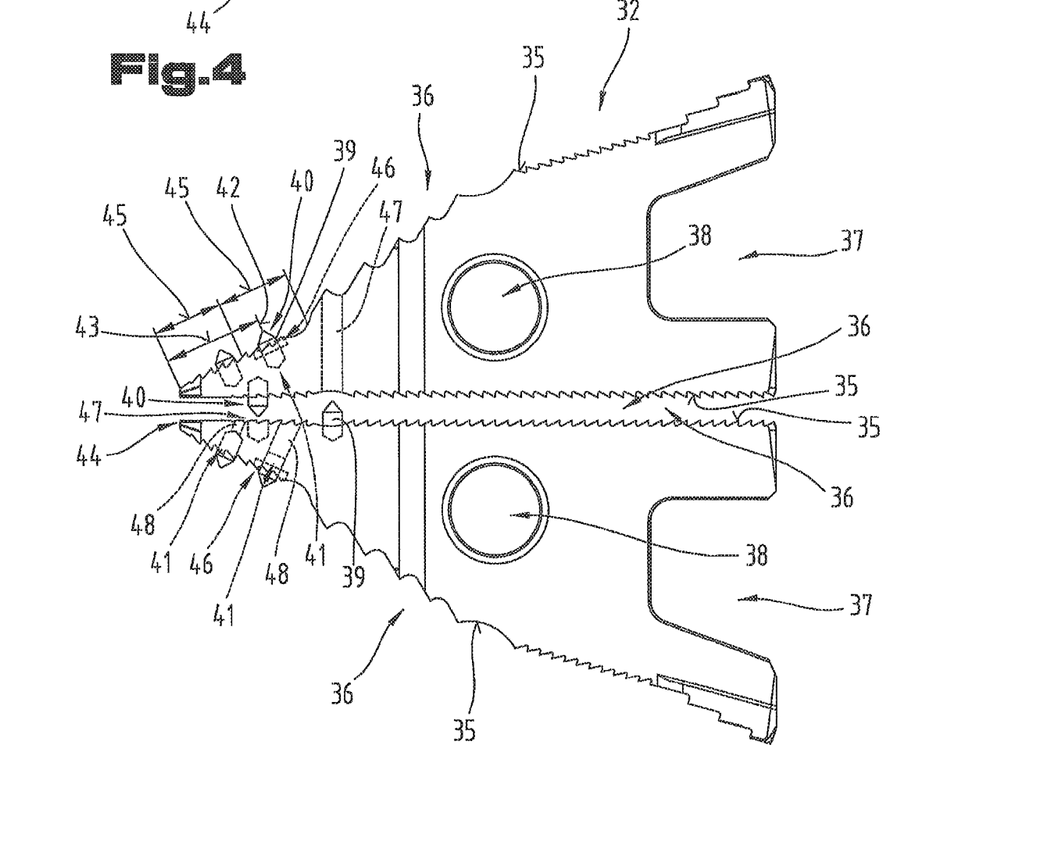
FIG. 4 a front view of two oppositely lying spreader tips.

FIG. 4 illustrates another embodiment of the spreader tip 32 which may be construed as an independent embodiment in its own right, the same reference numbers and component names being used to denote parts that are the same as those described in connection with FIGS. 1-3 above. To avoid unnecessary repetition, reference may be made to the more detailed description given above in connection with FIGS. 1-3.

FIG. 4 is a side view illustrating two oppositely lying spreader tips 32. Accordingly, the bores 41 for accommodating the insert elements 39 are clearly visible. In the case of the spreader tip 32 at the bottom, one of the insert elements 39 is illustrated with a land 46, the purpose of which is to enable the forces acting on the insert element 39 to be transmitted from the insert element 39 into the spreader tip 32 across a larger surface area.

Furthermore, in the embodiment illustrated in FIG. 4, insert elements 39 are provided not only on the outwardly lying working faces 35 but also on the inwardly lying working faces 35 facing one another. In the latter, a recess 47 is provided for accommodating an insert element 39 of the oppositely lying spreader tip 32. The recess 47 is provided because the two inwardly lying working faces 35 of the spreader tips 32 can be moved so far towards one another that they come into contact with one another, in other words they can be moved closer together than illustrated in FIG. 4. The recess 47 should be large enough so that the insert element 39 can also slide into the recess 47 without contact if the positions of the two spreader tips 32 do not exactly match one another. Accordingly, the recess 47 of the spreader tip 32 may be of a generous size so as to guarantee that the oppositely lying insert element 39 can be accommodated at any time.

The recess 47 lying closer to the wedge-shaped tip 44 of the spreader tip 32 is illustrated as a blind bore. By contrast, the recess 47 disposed farther away from the wedge-shaped tip 44 of the spreader tip 32 is illustrated as an end-to-end bore. In this respect, it is possible for several or none of the recesses 47 to be provided as end-to-end bores.

FIG. 4 also illustrates one possible embodiment in which a bore 41 used to accommodate an insert element 39 connects with an end-to-end bore 48. As may be seen from FIG. 4, this end-to-end bore 48 may be of the same diameter as the bore 41 or may be of a smaller diameter. These end-to-end bores 48 are used to make it easier to replace insert elements 39 and are not absolutely necessary. Instead, it may be that end-to-end bores 48 of this type connect with only specific ones of the bores 41.

The embodiments illustrated as examples represent possible variants of the spreader tip 32 and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of the different examples of embodiments described and illustrated may be construed as independent or inventive solutions of the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1-4 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the rescue tool 1, it and its constituent parts are illustrated to a certain extent out of scale and/or on an enlarged scale and/or on a reduced scale.

LIST OF REFERENCE NUMBERS

1 Rescue tool
2 Drive device
3 Cylindrical body
4 Spreader arm
5 Spreader arm
6 Hydraulic unit
7 Line
8 Handle
9 Control means
10 Hydraulic cylinder
11 Actuator means
12 End flange
13 Bearing housing
14 Bearing plate
15 Bearing plate
16 Carrying handle
17 Pivot axis
18 Longitudinal mid-axis
19 Pivot bearing
20 Pivot bearing arrangement
21 Double arrow
22 Transmission lever
23 Transmission lever
24 Pivot bearing
25 Pivot bearing
26 Inside face
27 Inside face
28 Angle
29 Outside face
30 Outside face
31 Protuberance
32 Spreader tip
33 Bolt
34 End region
35 Working face
36 Toothed surface
37 Receiving orifice
38 Bore
39 Insert element
40 Portion
41 Bore
42 Row
43 Distance
44 Wedge-shaped tip
45 Part-portion
46 Land
47 Recess
48 End-to-end bore

The invention claimed is:

1. A spreader tip for replaceable attachment to a spreader arm of a rescue tool, the spreader tip comprising:
a spreader tip body formed of a first material, the first material having first material properties;
a working face;
at least one insert element:
mounted on the working face,
protruding from the spreader tip body,
being formed of a second material,
comprising a pin, and
being inserted in the working face;
wherein the second material has second material properties different from the first material properties.

2. The spreader tip according to claim 1, wherein the at least one insert element is made from carbide and has an insert element wear resistance;
wherein the spreader tip body has a spreader tip body wear resistance; and
wherein the insert element wear resistance is greater than the spreader tip body wear resistance.

3. The spreader tip according to claim 1, wherein the at least one insert element is made from carbide and has an insert element compression strength and/or hardness;
wherein the spreader tip body has a spreader tip body compression strength and/or hardness; and
wherein the insert element compression strength and/or hardness is greater than the spreader tip body compression strength and/or hardness.

4. The spreader tip according to claim 1, wherein the at least one insert element is joined to the spreader tip body via a firmly bonded connection.

5. The spreader tip according to claim 1, wherein the at least one insert element is mounted in the spreader tip body via a positive connection.

6. The spreader tip according to claim 1, wherein the at least one insert element is mounted in the spreader tip body via a frictional connection.

7. The spreader tip according to claim 1, wherein the at least one insert element is a sintered part.

8. The spreader tip according to claim 1, further comprising a plurality of insert elements disposed in several rows; and
a wedge-shaped tip;

wherein the rows of the insert elements are disposed at different distances from the wedge-shaped tip.

9. The spreader tip according to claim 1, further comprising a wedge-shaped tip; and
a plurality of insert elements;
wherein the working face comprises several part-portions of identical size;
wherein a first part-portion of the several part-portions lies closest to the wedge-shaped tip and has a first amount of the insert elements;
wherein a second part-portion of the several part-portions has a second amount of the insert elements; and
wherein the first amount is less than the second amount.

10. The spreader tip according to claim 1, wherein the at least one insert element has a first region lying outside the spreader tip body; and
wherein the first region comprises a point.

11. The spreader tip according to claim 1, further comprising a recess on the working face.

12. The spreader tip according to claim 11, wherein the recess is a through bore.

13. The spreader tip according to claim 1, further comprising a first bore in the spreader tip body and a second bore in the spreader tip body, the second bore being a through bore;
wherein the at least one insert element is disposed in the first bore; and
wherein the first bore connects with the second bore.

14. The spreader tip according to claim 1, wherein the at least one insert element comprises a land.

15. A rescue tool comprising:
a first spreader arm;
a second spreader arm cooperating with the first spreader arm; and
a first spreader tip replaceably attached to the first spreader arm;
wherein the first spreader tip comprises:
a first spreader tip body formed of a first material, the first material having first material properties;
a first working face; and
at least one first insert element:
mounted on the first working face,
protruding from the first spreader tip body,
being formed of a second material,
comprising a first pin, and
being inserted in the first working face;
wherein the second material has second material properties different from the first material properties.

* * * * *